United States Patent [19]

Romstad et al.

[11] Patent Number: 5,253,995

[45] Date of Patent: Oct. 19, 1993

[54] APPARATUS FOR MAKING A PULSE DAMPENER

[75] Inventors: Bruce A. Romstad, Deford; Frederick J. Whitcroft, Bloomfield Hills, both of Mich.

[73] Assignee: Caro Manufacturing Corporation, Caro, Mich.

[21] Appl. No.: 797,408

[22] Filed: Nov. 25, 1991

Related U.S. Application Data

[62] Division of Ser. No. 413,945, Sep. 28, 1989, abandoned.

[51] Int. Cl.$^5$ ............... B29C 49/30; B29D 22/00
[52] U.S. Cl. .................... 425/522; 264/524; 264/534; 425/395; 425/527
[58] Field of Search ............ 425/352, 387.1, 390, 425/394, 395, 405.1, 522, 527, 541; 264/534, 524

[56] References Cited

U.S. PATENT DOCUMENTS

| | | | |
|---|---|---|---|
| 1,654,647 | 1/1928 | Heist | 425/395 |
| 2,371,061 | 3/1945 | Milano | 425/395 |
| 2,541,249 | 2/1951 | Hobson | 249/119 |
| 4,645,447 | 2/1987 | Sumitomo | 425/450.1 |

FOREIGN PATENT DOCUMENTS

| | | |
|---|---|---|
| 1085662 | 7/1954 | Fed. Rep. of Germany . |
| 1338443 | 8/1963 | France . |
| 53-60966 | 5/1978 | Japan ............... 425/395 |
| 57-83436 | 5/1982 | Japan . |
| 58-90927 | 5/1983 | Japan . |
| 1119176 | 10/1965 | United Kingdom . |

*Primary Examiner*—Jay H. Woo
*Assistant Examiner*—James P. Mackey
*Attorney, Agent, or Firm*—Reising, Ethington, Barnard, Perry & Milton

[57] ABSTRACT

A molding apparatus for making a hollow pressurized pulse dampener including a fixed platen having a primary member extending from the fixed platen and a secondary member including a centrally disposed aperture and a second mold surface to define a mold cavity for molding an intermediate member. The primary member extends through the centrally disposed aperture of the secondary member and includes a distal terminal end which includes a first mold surface for molding a pulse dampener. The first mold surface is disposed recessed within the secondary member such that the secondary member is moveable with respect to the primary member to present the first mold surface in the mold cavity to define the pulse dampener from the intermediate member. The secondary member includes means for continuously, positively and precisely pressurizing the mold cavity and the intermediate member until the first mold surface is presented within the cavity to mold the pulse dampener.

1 Claim, 2 Drawing Sheets

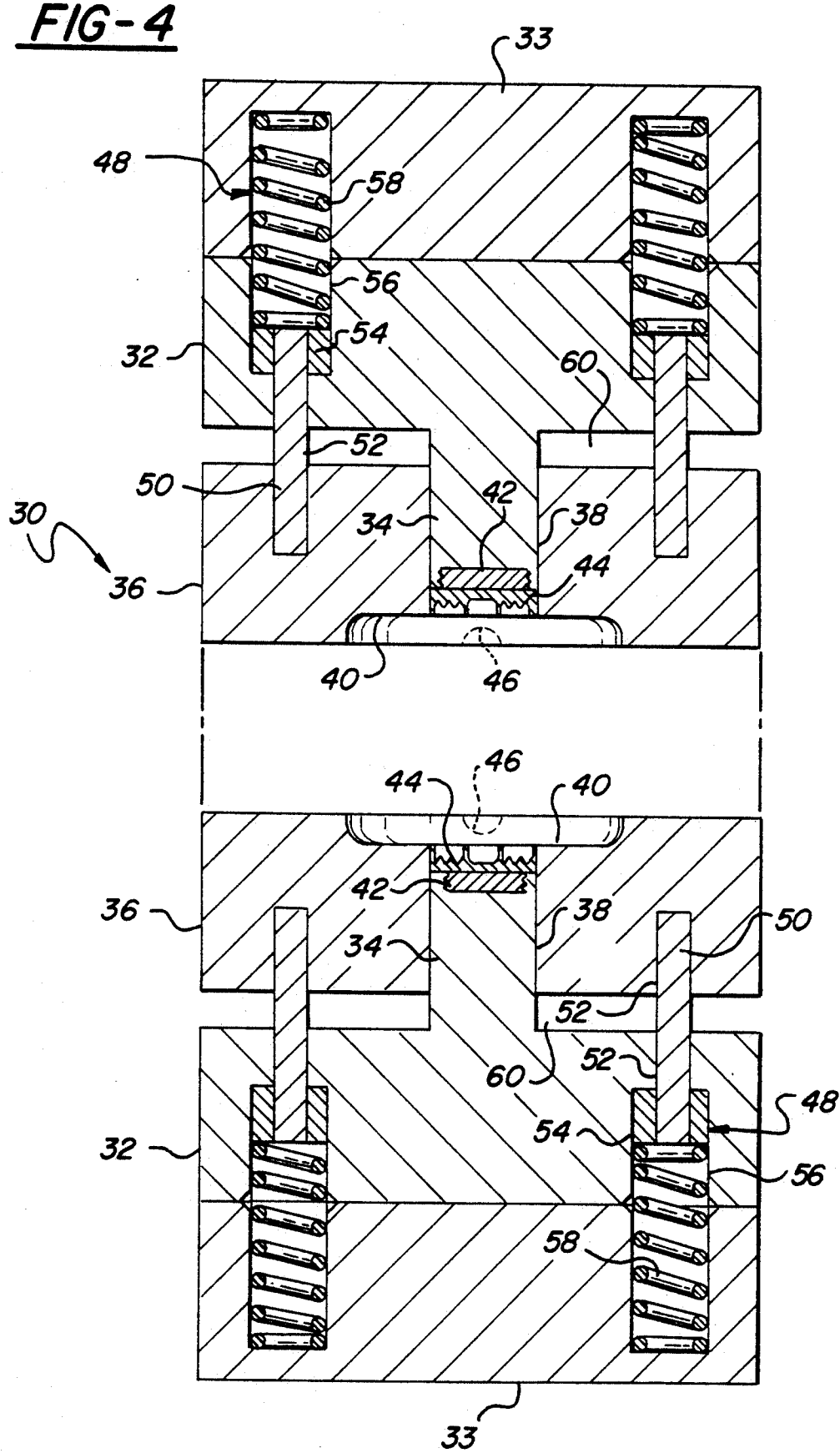

APPARATUS FOR MAKING A PULSE DAMPENER

This is a continuation of application Ser. No. 413,945, filed on Sept. 28, 1989, now abandoned.

BACKGROUND OF THE INVENTION (1) Technical Field

The invention relates to an apparatus for making pulse dampeners for use in fuel systems.

(2) Description of the Prior Art

One of the major concerns in the design, engineering and manufacture of the automobile is maintaining a quiet ride. In meeting these concerns, the automotive industry has endeavored to reduce, dampen or eliminate as much as possible the noise sources in the vehicle. One source of noise in the vehicle is derived from pressure pulses in a pressurized fuel line. More specifically, positive displacement fuel pumps as well as the on and off action of fuel injectors can cause undesirable "pulses" which create unwanted noise in the system.

Pulse dampeners are known in the prior art. Typically, a diaphragm-type accumulator is disposed along the fuel line between the fuel pump and the injectors. The pressurized fuel flows through an axial passage in the pulse dampener which includes an aperture which exposes a flexible diaphragm to the pressurized fuel. When a pressure pulse exceeds a predetermined level, the diaphragm flexes, thereby dampening the pressure pulses and smoothing out this operating parameter. Unfortunately, these types of pulse dampeners are relatively complex as compared to the subject invention and are much more expensive.

Other attempts have been made to reduce noise and dampen pulses in fuel systems by employing flexible members, typically made of a rubber based material, disposed inline in the fuel system for absorbing and dampening the pulses. Unfortunately, the desirable characteristics of these types of pulse dampeners in the prior art typically degrade with time when the material is exposed to gasoline or methanol.

The pulse dampener disclosed herein is manufactured using an apparatus and method which utilizes blow-mold technology. Methods and apparatus for making products using blow-mold technologies are known in the prior art. However, heretofore, it has not been possible to manufacture a pulse dampener of the subject invention utilizing blow-mold technology with the method and apparatus of the subject invention. The subject invention overcomes all of these deficiencies in the prior art in a very efficient, durable, and effective apparatus for making the pulse dampener disclosed herein.

SUMMARY OF THE INVENTION AND ADVANTAGES

The apparatus of the subject invention is employed to make a pulse dampener assembly for dampening pressure pulses in a fuel system. The assembly includes a hollow flexible member having an exterior surface and an interior surface with the interior surface defining a space sealed from the exterior surface. The pulse dampener assembly of the subject invention is characterized by including a fluid disposed within the interior space of the hollow flexible member and pressurized to a predetermined pressure to act on the interior surface to allow the hollow member to flex with predetermined deflection characteristics as the assembly is subjected to pressure within a fuel system.

The subject invention is directed toward a molding apparatus for making a hollow pressurized pulse dampener which has a fixed platen including a primary member extending forwardly from the fixed platen and a secondary member which includes a centrally disposed aperture and a second mold surface which defines a mold cavity for molding an intermediate member. The primary member is disposed through the centrally disposed aperture of the secondary member and includes a distal terminal end which presents a first mold surface for molding a pulse dampener. The first is disposed recessed within the secondary member. The assembly is characterized by the secondary member being moveable with respect to the primary member to present the first mold surface in the mold cavity to define the pulse dampener from the intermediate member.

The method of making a pulse dampener includes the steps of expanding a mold material into an intermediate member, and a defining a primary shape from an intermediate member. The method is characterized by continuously, positively and precisely pressurizing an intermediate member with a predetermined pressure until the primary shape is defined from an intermediate member.

Accordingly, the subject invention overcomes the problems of the prior art by including a pulse dampener assembly for dampening pressure pulses in fuel systems which is very effective and which is much less expensive than present assemblies employed in the prior art. The molding apparatus of the subject invention employs blow-molding technology to efficiently and effectively mold the pulse dampener of the subject invention. Finally, a method of making a pulse dampener is disclosed which overcomes the problems in the prior art by continuously, positively and precisely pressurizing an intermediate member with a predetermined pressure until the primary shape is defined from the intermediate member to make the pulse dampener.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a cross-sectional top view of the molding apparatus of the subject invention.

DESCRIPTION OF THE PREFERRED EMBODIMENT

Figure 1A:
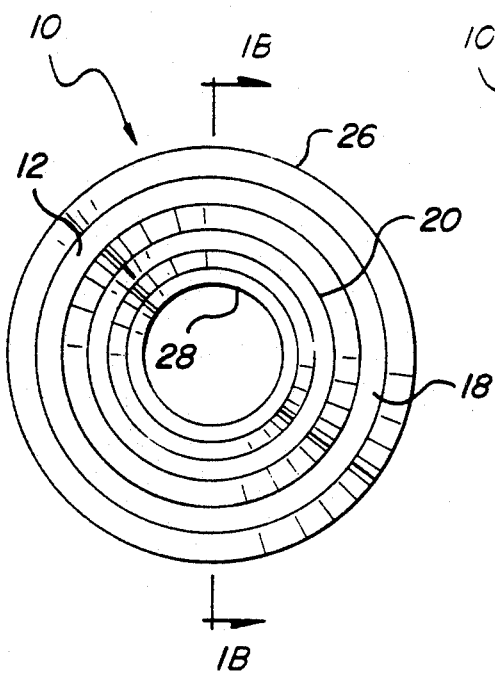
FIG. 1A is a top view of the pulse dampener.
Figure 1B:
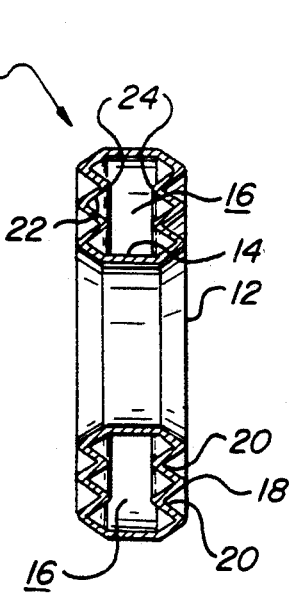
FIG. 1B is a cross-sectional side view of the pulse dampener taken substantially along lines 1B—1B of FIG. 1A.
Figure 2:
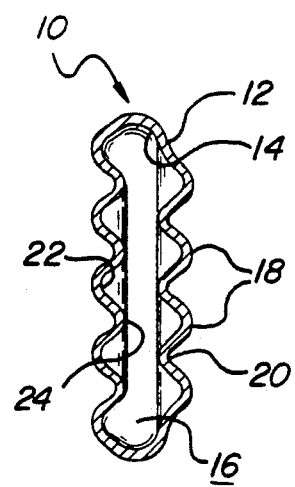
FIG. 2 is a cross-sectional side view of an alternative embodiment of the pulse dampener.

A pulse dampener for dampening pressure pulses in a fuel system is generally shown at 10 in FIGS. 1A–1B and 2. The pulse dampener includes a hollow flexible member having an exterior surface 12 and an interior surface 14 with the interior surface defining a space 16 sealed from the exterior surface 12. A fluid is disposed within the interior space 16 and is pressurized to a predetermined pressure to act on the interior surface 14 to allow the hollow member 10 to flex with predetermined deflection characteristics as the assembly is subjected to pressure pulses within a fuel system.

The exterior surface 12 includes at least one peak defining ridges 18 and valleys 20 for facilitating the hollow member 10 to flex in response to pressure pulses. The interior surface 14 includes at least one undulation including valleys 22 and peaks 24 corresponding to the ridges 18 and valleys 20 of the exterior surface 12 for facilitating the hollow member to flex in response to pressure pulses. The ridges, peaks and valleys make it possible for the hollow flexible member 10 to respond to variable pressure forces that exist in the system. More specifically, the ridges, peaks and valleys not only allow the hollow flexible member 10 of the pulse dampener to flex in response to the predetermined pressure, but also allow the amount of flex to vary as a result of the pressure. Said another way, as the pressure increases, the amount of resistance to flex in the pulse dampener assembly also increases. Aternatively, the ridges, peaks and valleys may be eliminated while retaining the desired deflection characteristics if the fluid disposed within the interior space 16 is pressurized at a higher predetermined pressure. The pulse dampener is pressurized during the blow-molding process, as will be described in further detail below.

The pulse dampener 10 may be constructed in any geometric shape which is dictated by other design parameters in the fuel system. For example, the hollow flexible member of the subject invention may be substantially doughnut-shaped having a radial edge 26 and a centrally disposed aperture 33 extending through the member. Further, the ridges 18 and valleys 20 of the exterior surface 12 as well as the valleys 22 and peaks 24 of the interior surface 14 may be disposed concentrically with respect to the centrally disposed aperture Alternatively, the pulse dampener assembly of the subject invention may be circular, square, or any other geometric configuration as illustrated in FIG. 2.

Finally, in the preferred embodiment, the pulse dampener is made of acetal. The use of this material is particularly advantageous because it does not degrade or breakdown with time when exposed to gasoline or methanol. Further, acetal is a material which may be used in blow-molding processes as will be described in further detail below.

Figure 3:
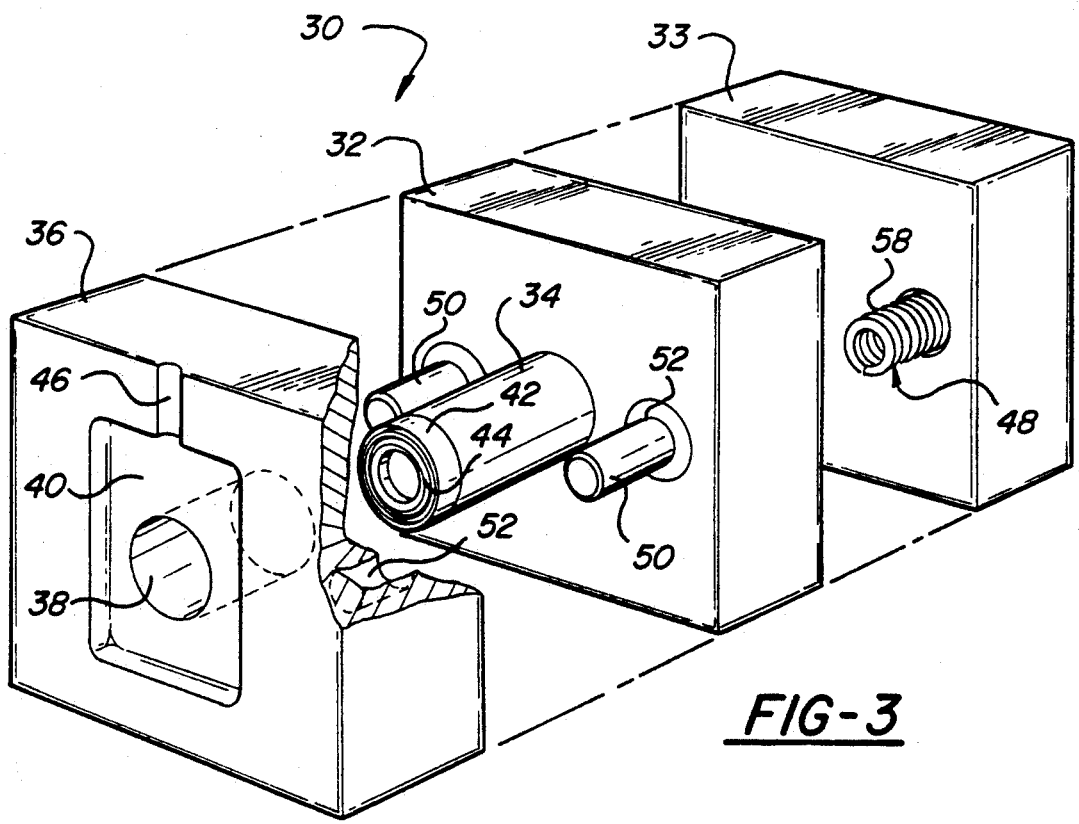
FIG. 3 is an exploded perspective view of one-half of the molding apparatus for making the pulse dampener.

A molding apparatus for making a hollow pressurized pulse dampener 10 is generally indicated at 30 in FIG. 3 and 4. The apparatus includes a two-mold assembly with each half oppositely disposed with respect to each other and symmetrical with respect to each other for forming a pulse dampener 10 as illustrated in FIG. 4. However, because the two-mold assemblies are identical with respect to one another, only one of the assemblies is illustrated in FIG. 3. The molding apparatus 30 includes a fixed platen 32 having a generally rectangular cross-section which, in turn, is mounted to a support block 33. The fixed platen 32 includes a primary member 34 which is generally circular in cross-section but which may be of any geometric shape. The primary member 34 extends forwardly of the fixed platen 32 and has a smaller cross-sectional area with respect to the fixed platen 32. The apparatus 30 further includes a secondary member 36 which also has a substantially rectangular cross-section with a cross-sectional area similar to that of fixed platen 32. The secondary member 36 includes a centrally disposed aperture 38 which closely conforms to the surface of the circular primary member 34 and a second mold surface 40 to define a mold cavity for molding an intermediate member. More specifically, and as alluded to above, the apparatus 30 includes a pair of fixed platens 32 and a pair of secondary members 36, each oppositely disposed with respect to one another and adapted for mating sealed engagement to define a mold cavity and to form the pulse dampener 10.

The primary member 34 is disposed through the centrally disposed aperture 38 of the secondary member 36 and includes a distal terminal end 42 which presents a first mold surface 44 for molding the pulse dampener 10. The terminal end 42 may be threadably and removeably attached to the primary member 34 as best illustrated in FIG. 4. In this way, pulse dampeners having various geometric configurations and deflection characteristics may be manufactured by changing the terminal ends 42 of the primary member 34. Further, the first mold surface 44 may include a series of ridges and grooves for creating the ridges 18 and valleys 20 of the exterior surface 12 and the valleys 22 and peaks 24 of the interior surface of the pulse dampener 10. Alternatively, the first mold surface 44 may be smooth or include other surfaces to define any other portion of the pulse dampener as may be needed.

The first mold surface 44 is disposed recessed within the secondary member 36. The secondary member 36 is moveable with respect to the primary member 34 to present the first mold surface 44 in the mold cavity to define the pulse dampener 10 from the intermediate member. Further, the secondary member 36 includes means 46 for continuously, positively and precisely pressurizing a mold cavity and the intermediate member formed by the assembly until the first mold surface 44 is presented within the cavity to mold the pulse dampener 10. More specifically, the means for continuously, positively and precisely pressurizing the mold cavity and the intermediate member includes a pair of grooves 46 oppositely disposed with respect to each other on the secondary members 36 for defining a passageway when the oppositely disposed mold assemblies are brought together in mating sealed engagement. The passageway provides fluid communication between the mold cavity and a pressurized fluid source for pressurizing the intermediate member and the pulse dampener to a precise, predetermined level.

The apparatus 30 also includes a biasing means, generally indicated at 48 to bias the secondary member 36 such that the first mold surface 44 is disposed recessed within the secondary member 36. More specifically, a pair of biasing means 48 are disposed on either side of the primary member 34. The biasing means 48 includes a plunger 50 which is disposed within a connecting passageway 52 which, itself, extends between the secondary member 36 and the fixed platen 32. The plunger 50 terminates in a bushing 54 which, in turn, is disposed in a cavity 56. The cavity 56 extends between the platen 32 and the support block 33. A coiled spring 58 is disposed within the cavity 56 and acts between the support blocks 33 and the bushing 54 through the plunger 50 to bias the secondary members 36 forward such that the first mold surface 44 is disposed recessed within the second mold 40. When the secondary member 36 is so biased, a gap 60 is presented between the secondary member 36 and the fixed platen 32. In this way, the secondary member 36 is allowed to move rearwardly back toward the fixed platen 32 against the biasing force of the biasing means 48, eliminating the gap 60 and at the same time presenting the first mold surface 44 into the cavity to mold the pulse dampener 10.

The method of making a pulse dampener includes the steps of expanding a mold material into a intermediate member, defining a primary shape from the intermediate member and by continuously, positively and precisely pressurizing the intermediate member with a predetermined pressure until the primary shape is defined from the intermediate member. More specifically, the step of expanding a mold material into an intermediate member includes the steps of moving a pair of oppositely disposed secondary members 36 into mating and sealed engagement to define a mold cavity, introducing the mold material into the mold cavity and expanding the mold material throughout the mold cavity. Further, the step of defining the primary shape from the intermediate member includes the steps of presenting a pair of first mold surfaces 44 into the cavity and into mating and sealed engagement to form the primary shape.

The apparatus 30 of the subject invention operates in the following manner. The two symmetrical mold assemblies are moved toward each other such that the secondary members 36 come into mating and sealed engagement. Just before the two members meet, a special material, acetal, is introduced between the two members via a blow tube, as is commonly known in the blow-molding art. The two secondary members 36 come together to form a mold cavity defined by the second meld surfaces 40 which in turn forms the intermediate member. The mold material, acetal, is then expanded or "blown" into the mold cavity using a predetermined pressure through the mating grooves 46 formed in the symmetrical second mold surfaces 40 and which form the molded passageway in the mold material. The mold material is allowed to begin to set. During this time, the now forming intermediate member is being subjected to the predetermined pressure. At a predetermined time, increased force is placed on a fixed platen 32 which forces the moveable secondary member 36 to move rearwardly against the force of the biasing means 48 back toward the platen 32 closing the gap 60 and thus exposing the terminal ends 42 of the primary member 34 and bringing the first mold surfaces 44 which define the pulse dampener 10 together within the intermediate member formed by the second mold surfaces 40. Said another way, the cavities come together to punch-out a hollow pulse dampener 10 within which is captured a positive, predetermined pressure. This important positive pressure feature is "captured" from the intermediate member by continuously pressurizing the secondary mold cavity throughout the process.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that within the scope of the appended claims the invention may be practiced otherwise than as specifically described.

What is claimed is:

1. A molding apparatus for making a hollow pressurized pulse dampener, said apparatus comprising;

a pair of platens fixedly attached to a pair of support blocks, a pair of secondary members, each secondary member associated with one of said fixed platens, one of said fixed platens and one of said secondary members from each pair being oppositely disposed with respect to one another, each of said fixed platens including a primary member extending from said fixed platen, each of said secondary members including a centrally disposed aperture and a second mold surface, said oppositely disposed platens and secondary members adapted for mating engagement to define a mold cavity for molding an intermediate member;

said primary member disposed through said centrally disposed aperture of said associated secondary member and including a distal terminal end which includes a first mold surface for molding a pulse dampener;

biasing means for biasing each secondary member with respect to the associated primary member, including a pair of plungers disposed within a pair of connecting passageways extending between associated ones of said secondary members and said fixed platens, said pair of plungers terminating in a pair of bushings disposed within a pair of bushing cavities, said bushing cavities extending between said platens and said support blocks, and a spring disposed within each of said pair of bushing cavities and acting between said support blocks and said bushings, to bias said plungers and the secondary members such that said first mold surfaces are disposed recessed within said secondary members;

said secondary members being moveable with respect to said primary members to present said first mold surfaces in said mold cavity to form said pulse dampener from said intermediate member, said secondary members including means for continuously, positively and precisely pressurizing said mold cavity and said intermediate member until said first mold surfaces are presented within said cavity to mold said pulse dampener, said pressurizing means including a pair of grooves oppositely disposed with respect to each other on said secondary members for defining a passageway, said passageway providing fluid communication between said mold cavity and a pressurized fluid source for pressurizing said intermediate member and said pulse dampener to a precise, predetermined level.

* * * * *